(12) United States Patent
Aufleger

(10) Patent No.: US 9,683,343 B2
(45) Date of Patent: Jun. 20, 2017

(54) CABLE SCREEN FOR FISH PROTECTION PURPOSES

(71) Applicant: Universitat Innsbruck, Innsbruck (AT)

(72) Inventor: Markus Aufleger, Penzberg (DE)

( * ) Notice: Subject to any disclaimer, the term of this patent is extended or adjusted under 35 U.S.C. 154(b) by 115 days.

(21) Appl. No.: 14/517,187

(22) Filed: Oct. 17, 2014

(65) Prior Publication Data

US 2015/0034016 A1 Feb. 5, 2015

Related U.S. Application Data

(63) Continuation of application No. PCT/EP2013/058139, filed on Apr. 19, 2013.

(51) Int. Cl.
| | |
|---|---|
| *E02B 5/08* | (2006.01) |
| *E02B 1/00* | (2006.01) |
| *A01K 29/00* | (2006.01) |
| *E02B 3/00* | (2006.01) |

(52) U.S. Cl.
CPC ............. *E02B 5/085* (2013.01); *A01K 29/00* (2013.01); *E02B 1/006* (2013.01); *E02B 3/00* (2013.01); *E02B 5/08* (2013.01)

(58) Field of Classification Search
CPC ............. E02B 1/006; E02B 5/08; E02B 5/085
USPC ........................................................ 119/219
See application file for complete search history.

(56) References Cited

U.S. PATENT DOCUMENTS

| | | | | |
|---|---|---|---|---|
| 1,739,701 A | | 12/1929 | Wilson | |
| RE22,060 E | * | 4/1942 | Hayden | E01F 15/06 |
| | | | | 256/13.1 |
| 2,641,221 A | * | 6/1953 | Sibinski | E02B 1/003 |
| | | | | 119/219 |
| 2,709,984 A | * | 6/1955 | Marks | A01K 79/02 |
| | | | | 119/220 |
| 2,778,140 A | * | 1/1957 | Applegate | A01K 79/02 |
| | | | | 119/220 |
| 2,826,897 A | * | 3/1958 | Vinsonhaler | E02B 1/003 |
| | | | | 119/219 |
| 6,485,225 B1 | * | 11/2002 | Baker | E01F 13/028 |
| | | | | 160/331 |
| 6,962,328 B2 | * | 11/2005 | Bergendahl | E01F 15/06 |
| | | | | 256/1 |
| 7,975,425 B1 | * | 7/2011 | VanBurch | A01K 79/02 |
| | | | | 43/17.1 |
| 8,458,956 B2 | * | 6/2013 | Hoermann | E06B 9/68 |
| | | | | 49/199 |
| 8,992,116 B2 | * | 3/2015 | Sloan | E01F 13/12 |
| | | | | 256/13.1 |

(Continued)

FOREIGN PATENT DOCUMENTS

| | | |
|---|---|---|
| AU | 2002318764 | 8/2003 |
| DE | 38 31 099 A1 | 3/1990 |

(Continued)

OTHER PUBLICATIONS

PCT Patent Application PCT/EP2013/058139 International Search Report Jun. 5, 2013, 4 pages.

*Primary Examiner* — Monica Williams
(74) *Attorney, Agent, or Firm* — Lathrop & Gage LLP

(57) ABSTRACT

An apparatus for holding back, and diverting, fish in bodies of water by the arrangement of parallel cables (S) braced between two or more abutments (W), wherein the distance between the cables is small enough to prevent fish from swimming through the apparatus.

5 Claims, 1 Drawing Sheet

(56) References Cited

U.S. PATENT DOCUMENTS

| | | | |
|---|---|---|---|
| 2002/0014620 A1* | 2/2002 | Nilsson | E01F 15/0461 |
| | | | 256/59 |
| 2002/0185639 A1* | 12/2002 | Galivan | E04H 17/12 |
| | | | 256/32 |
| 2006/0096547 A1* | 5/2006 | Massey | A01K 61/001 |
| | | | 119/219 |
| 2006/0174839 A1* | 8/2006 | Ely | A01K 79/00 |
| | | | 119/219 |
| 2008/0298899 A1 | 12/2008 | Glessner | |
| 2010/0242851 A1 | 9/2010 | Carstensen et al. | |

FOREIGN PATENT DOCUMENTS

| | | |
|---|---|---|
| DE | 44 13 841 A1 | 11/1994 |
| DE | 198 02 979 A1 | 7/1999 |
| DE | 198 08 328 A1 | 9/1999 |
| DE | 10 2007 047 361 A1 | 4/2009 |
| GB | 191423489 | 9/1915 |
| GB | 2478862 | 9/2011 |
| WO | 2009023450 | 2/2009 |
| WO | WO 2009/047213 A1 | 4/2009 |

* cited by examiner

CABLE SCREEN FOR FISH PROTECTION PURPOSES

RELATED APPLICATIONS

This application is a continuation of International Patent Application No. PCT/EP2013/058139, filed Apr. 19, 2013, which claims the benefit of priority of German Patent Application No. 10 2012 206 504.0, filed Apr. 19, 2012. Each of the aforementioned applications is incorporated herein by reference.

FIELD

The present invention relates to an apparatus for holding back, and diverting, fish in bodies of water, the use of such an apparatus in a body of water and a method for holding back fish in a body of water.

BACKGROUND

Gratings are arranged at the inlets to hydroelectric installations. An essential function of these gratings is fish protection. In their capacity as a mechanical barrier, the gratings are intended to prevent the fish from swimming into the turbine inlets in their downstream migration. Depending on the type of turbine and the size of fish, some of the creatures entering the turbine area are injured or killed. The smaller the gaps between the bars of the gratings, the better the fish are held back.

In the course of the approval proceedings for hydroelectric installations, very small grating spacings are often stipulated for the purposes of fish protection. The smaller the spacings of the gratings, however, the higher the hydraulic losses and the costs involved in cleaning and maintaining the gratings.

Typically, the gratings are arranged in an upright position at the entrances to the hydroelectric installations, i.e. in front view the bars of the gratings extend vertically. Taking account of the typical body shape of fish, gratings with horizontally extending grating bars have proved advantageous. These are increasingly being used at new hydroelectric installations but give rise to by no means negligible investment and maintenance costs.

From DE 38 31 099 A1, a fine grating is known in which a wire cable is braced between two rollers. This is not a fish protection cable screen; in particular, a grating of this kind is not suitable for mounting at an inlet of a hydroelectric installation.

In DE 44 13 841 A1 and U.S. Pat. No. 1,739,701 A, grating-like structures are described in which cables are braced in a frame, in order to cope with comparatively small bracing widths. These are not fish protection cable screens with braced cables for holding back and diverting fish.

SUMMARY

An apparatus for holding back and diverting fish in bodies of water, the use of such an apparatus in a body of water and a method for holding back fish in a body of water having the features of the independent claims are proposed.

Advantageous embodiments are the subject-matter of the sub-claims and the description that follows.

By means of cables braced (substantially) parallel below the surface of the body of water, a structure is obtained which is able to hold fish back or divert them sideways. In this way, for example, fish can be prevented from swimming into the inlets of hydroelectric installations. For cleaning purposes and at times of high water the cables are laid on the bed of the body of water.

During operation the cables are braced between at least two abutments horizontally spaced from one another which laterally define the body of water that is to be secured. The spacing of the abutments from one another will depend on the body of water that is to be secured, but in practice will regularly be more than 5 m. The abutments are preferably free-standing so that they are not supported on one another. The abutments may be firmly anchored in the substratum of the body of water, on the bank of the body of water or on a solid structure in the of the body of water (e.g. a river bed or channel).

The cables braced between the abutments therefore extend in a direction that also has a horizontal component, and they extend vertically spaced from one another. The vertical spacing of the cables is expediently only a few centimetres (less than 5 or 10) and is thus so small that fish whose body height exceeds the spacing between the cables are prevented from swimming through the apparatus.

It should be pointed out that within the scope of the invention the cables may deviate from a precisely parallel configuration and from a precisely horizontal direction.

Further advantages and embodiments of the invention will become apparent from the description and the accompanying drawings.

It will be understood that the features mentioned hereinbefore and those to be explained hereinafter may be used not only in the particular combination mentioned but also in other combinations or on their own without departing from the scope of the present invention.

The invention is schematically illustrated in the drawings by means of embodiments by way of example and is hereinafter described in detail with reference to the drawings.

DETAILED DESCRIPTION OF THE EMBODIMENTS

Figure 1:
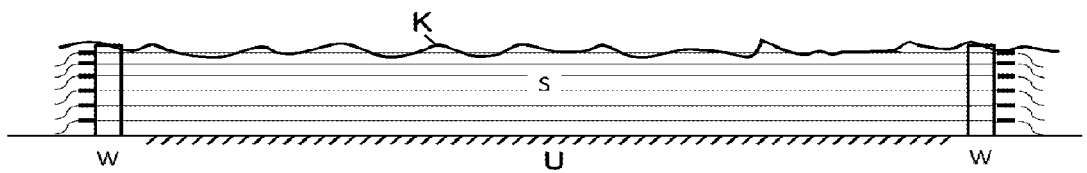
FIG. 1 shows a cable screen for fish protection having cables horizontally braced below the surface of a body of water between two abutments in a normal position.

The fish protection cable screen differs from the gratings previously used in its fundamental construction and mode of operation. The mechanical barrier required for fish protection is achieved by a plurality of cables S braced parallel or substantially parallel to one another. Typically, the cables are braced horizontally below the surface of the body of water between two or more abutments W (FIG. 1). In this way, large span widths can be achieved inexpensively and making the best possible use of the material properties. Each individual cable S can be braced at one or more abutments W, and also cast off from them, independently of the other cables S. For this reason, a tension device for each individual cable is attached on at least one of the abutments W for repeatedly stretching tight and relaxing the corresponding cable S. The tension device can be a winch.

Figure 2:
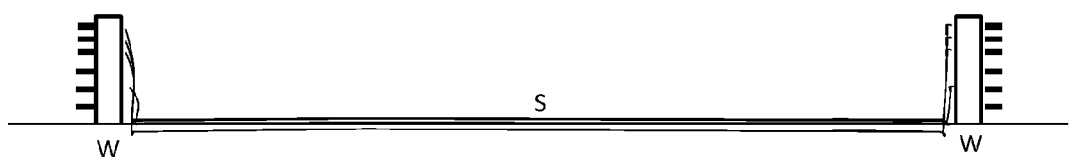
FIG. 2 shows the fish protecting cable screen of FIG. 1 in an open position.

The fish protection cable screen can easily be opened completely by casting off the individual cables S (FIG. 2). This is particularly important with high outflows to avoid log jams and harmful interactions with the bed load. Also the fish protection cable screen is cleaned by partially or completely laying the cables S flat and then stretching them tight.

Figure 3:
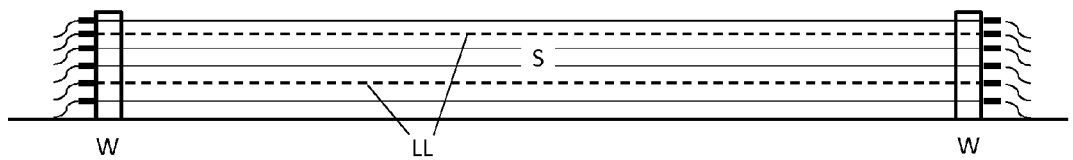
FIG. 3 shows a further developed fish protecting cable screen with cable sections comprising linear light elements, said cable sections being braced horizontally between two abutments, in a normal position.

The effect of the fish protection cable screen can be further enhanced by setting the cables S vibrating. For this reason, at least one vibration device is attached on at least one of the abutments W for making the cables S to vibrate. Alternatively or additionally, it is possible to integrate other fish-repelling measures, such as, for example, the arrangement of linear light elements LL (FIG. 3), in the fish protection cable screen. As another example, some embodiments are configured to apply electric current to one or more of the cables S. These measures constitute a behavioural barrier that may deter even smaller fish from swimming through the apparatus.

LIST OF REFERENCES

W abutment
S cables
LL linear light element

I claim:

1. Method for holding back fish in a body of water, comprising horizontally bracing cables (S) essentially parallel below the surface of a body of water between two or more horizontally spaced abutments (W) such that the cables are not connected together below the surface of the body of water, a vertical spacing between the cables being such that the fish that are to be held back are prevented from swimming through.

2. Method according to claim 1, further comprising relaxing the cables (S) for opening.

3. Method according to claim 1, further comprising vibrating the cables (S).

4. Method according to claim 1, further comprising illuminating the cables (S).

5. Method according to claim 1, further comprising applying electric current to one or more of the cables (S).

* * * * *